United States Patent
Doerband

(10) Patent No.: US 7,522,292 B2
(45) Date of Patent: Apr. 21, 2009

(54) SYSTEM AND METHOD FOR DETERMINING A SHAPE OF A SURFACE OF AN OBJECT AND METHOD OF MANUFACTURING AN OBJECT HAVING A SURFACE OF A PREDETERMINED SHAPE

(75) Inventor: Bernd Doerband, Aalen (DE)

(73) Assignee: Carl Zeiss SMT AG, Oberkochen (DE)

( * ) Notice: Subject to any disclaimer, the term of this patent is extended or adjusted under 35 U.S.C. 154(b) by 188 days.

(21) Appl. No.: 11/372,159

(22) Filed: Mar. 10, 2006

(65) Prior Publication Data

US 2006/0215177 A1   Sep. 28, 2006

Related U.S. Application Data

(60) Provisional application No. 60/660,459, filed on Mar. 11, 2005.

(51) Int. Cl.
  G01B 11/24 (2006.01)
  G01B 11/30 (2006.01)
  G01B 11/02 (2006.01)
(52) U.S. Cl. .................................................... 356/601
(58) Field of Classification Search ................ 356/445, 356/600, 601, 609
  See application file for complete search history.

(56) References Cited

U.S. PATENT DOCUMENTS

| | | | |
|---|---|---|---|
| 4,340,306 A | 7/1982 | Balasubramanian | |
| 4,710,642 A * | 12/1987 | McNeil | 250/559.04 |
| 4,732,483 A | 3/1988 | Biegen | |
| 5,004,346 A | 4/1991 | Kuhel | |
| 5,473,434 A | 12/1995 | De Groot | |
| 5,488,477 A | 1/1996 | De Groot | |
| 5,548,403 A | 8/1996 | Sommargren | |
| 5,777,741 A | 7/1998 | Deck | |
| 5,867,276 A * | 2/1999 | McNeil et al. | 356/445 |
| 6,456,382 B2 | 9/2002 | Ichihara et al. | |
| 6,714,307 B2 | 3/2004 | De Groot et al. | |
| 2002/0089741 A1 | 7/2002 | Kuhn | |
| 2003/0048454 A1 | 3/2003 | Prinzhausen et al. | |
| 2003/0048457 A1 | 3/2003 | Evans et al. | |
| 2003/0128368 A1 | 7/2003 | Kuchel | |

(Continued)

FOREIGN PATENT DOCUMENTS

EP   0 370 229 B1   1/1993

(Continued)

OTHER PUBLICATIONS

D. Malacara, "Optical Shop Testing," 2$^{nd}$ Edition, John Wiley & Sons, Inc., 1992, Chapter 2.1, pp. 51-53.

(Continued)

Primary Examiner—Michael A Lyons
(74) Attorney, Agent, or Firm—Jones Day

(57) ABSTRACT

A system and method for determining a shape of a surface comprises a chromatic imaging optics for generating a dispersion in a measuring light. Colour information contained in measuring light emerging from the surface to be tested and received by a detector may be used to determine the shape of the surface to tested.

46 Claims, 9 Drawing Sheets

U.S. PATENT DOCUMENTS

2003/0147086 A1* 8/2003 Rosencwaig et al. ........ 356/601
2003/0160968 A1 8/2003 Deck
2003/0234936 A1 12/2003 Marron

FOREIGN PATENT DOCUMENTS

| WO | WO 03/001147 A1 | 1/2003 |
| WO | WO 03/021184 A1 | 3/2003 |
| WO | WO 03/044454 A1 | 5/2003 |
| WO | WO 03/044456 A1 | 5/2003 |

OTHER PUBLICATIONS

D. Malacara, "Optical Shop Testing," $2^{nd}$ Edition, John Wiley & Son, Inc., 1992, Chapter 2.6, pp. 73-77.

D. Malacara, "Optical Shop Testing," $2^{nd}$ Edition, John Wiley & Son, Inc., 1992, Chapter 12, pp. 427-454.

P.P. Naulleau et al., "Extreme-ultraviolet phase-shifting point-diffraction interferometer: a wave-front metrology tool with subangstrom reference-wave accuracy," Applied Optics, vol. 38, No. 35, Dec. 10, 1999, pp. 7252-7263.

P. Hariharan, "Optical Interferometry," Sydney, Academic Press, 1985, Chapter 11 "Fourier-transform spectroscopy," pp. 181-193.

* cited by examiner

SYSTEM AND METHOD FOR DETERMINING A SHAPE OF A SURFACE OF AN OBJECT AND METHOD OF MANUFACTURING AN OBJECT HAVING A SURFACE OF A PREDETERMINED SHAPE

This application claims the benefit under 35 U.S.C. §119 (e) of U.S. Provisional Patent Application No. 60/660,459, filed Mar. 11, 2005, the entire contents of which are incorporated herein by reference.

BACKGROUND OF THE INVENTION

1. Field of the Invention

The present invention relates to a system and method for determining a shape of a surface of an object and to a method of manufacturing an object having a surface of a predetermined shape. In particular, the invention relates to measuring and manufacturing objects having surfaces of an aspherical shape. The systems and methods may be applied to measuring and manufacturing objects such as an optical element.

2. Brief Description of Related Art

The optical element may comprise, for example, an optical component such as an optical lens or an optical mirror used in optical systems, such as telescopes used in astronomy, and systems used for imaging structures, such as structures formed on a mask or reticle, onto a radiation sensitive substrate, such as a resist, in a lithographic method. The success of such an optical system is substantially determined by the accuracy with which the optical surface can be machined or manufactured to have a target shape determined by a designer of the optical system. In such manufacture it is necessary to compare the shape of the machined optical surface with its target shape, and to determine differences between the machined and target surfaces. The optical surface may then be further machined at those portions where differences between the machined and target surfaces exceed e.g. predefined thresholds.

Interferometric apparatuses are commonly used for measurements of optical surfaces. Examples of such apparatus are disclosed in U.S. Pat. Nos. 4,732,483, 4,340,306, 5,473,434, 5,777,741, 5,488,477. The entire contents of these documents are incorporated herein by reference.

The conventional interferometer apparatus for measuring a spherical optical surface typically includes a source of coherent light and an interferometer optics for generating a beam of measuring light having spherical wavefronts. The measuring light is incident on the surface to be tested, such that wavefronts of the measuring light have, at a position of the surface to be tested, a same shape as the target shape of the surface under test. In such a situation, the beam of measuring light is orthogonally incident on the surface under test, and is reflected therefrom to travel back towards the interferometer optics. Thereafter, the light of the measuring beam reflected from the surface under test is superimposed with light reflected from a reference surface and deviations of the shape of the surface under test and its target shape are determined from a resulting interference pattern.

While spherical wavefronts for testing spherical optical surfaces may be generated with a relatively high precision by conventional interferometer optics, more advanced optics, which are also referred to as compensators, null lens arrangements, or K-systems, are used to generate beams of measuring light having aspherical wavefronts such that the light is substantially orthogonally incident at each location of the aspherical surface under test. Background information relating to null lens arrangements or compensators is available e.g. from the text book of Daniel Malacara "Optical Shop Testing", 2$^{nd}$ Edition, John Wiley & Sons, Inc. 1992, Chapter 12.

For each application of measuring an aspherical surface of a particular type it is necessary to design and manufacture a corresponding null-lens arrangement for generating those aspherical wavefronts which are orthogonally incident on the aspherical surface of the particular type. This necessity limits flexibility in testing aspherical surfaces of various types.

From U.S. Pat. No. 5,004,346 there is known a method of testing aspherical surfaces using an interferometer optics generating spherical wavefronts. The spherical wavefronts are substantially orthogonally incident on the aspherical surface at only a portion thereof such that only this portion contributes to generation of interference fringes which are detected. By changing a distance between the interferometer optics and the aspherical surface to be tested it is possible to change the portions of the aspherical surface which contribute to generation of the detectable interference fringes. Thus, by testing the aspherical surface with the spherical wavefronts at plural distances of the aspherical surface from the interferometer optics, it is possible to test substantially the whole surface area of the aspherical surface and to calculate the surface shape thereof from the measurements taken at the plural distances.

For this purpose, it is necessary to precisely control the distance between the aspherical surface and the interferometer optics. Such method involves high requirements on actuators for translating the aspherical surface relative to the interferometer optics.

SUMMARY OF THE INVENTION

The present invention has been accomplished taking the above problems into consideration.

Embodiments of the present invention provide alternative methods of determining a surface shape of an object and to further provide a corresponding method of manufacturing the object.

Particular embodiments of the present invention provide a method of determining a shape of a surface of an object by generating measuring light of different wavelengths to be incident on the surface of the object from different directions of incidence, detecting wavelength dependent distributions of an intensity of the measuring light reflected from the object, and determining a shape of the surface of the object based upon the detected wavelength dependent distributions of intensity.

For generating the measuring light such that the directions of the incidence on the object are different for different wavelengths, a chromatic illuminating optics may be used. The chromatic illuminating optics is configured to intentionally generate a dispersion of the measuring light. This means that, for example, two coinciding light rays of different wavelengths entering the chromatic optics will be separated from each other due to the dispersive effect provided by the chromatic optics, and that the two rays of different wavelengths are emitted from the chromatic optics under different angles of emission. For example, the chromatic optics is sufficiently dispersive such that emission angles of the different wavelengths differ by more than about 1 arcmin. Similarly, the light which is incident on a selected location of the surface of the object will have a wavelength dependent direction of incidence. For example, the chromatic optics is sufficiently dispersive such that the directions of incidence of light of the different wavelengths differ by more than about 1 arcmin.

The direction of incidence of light of a particular wavelength on the object may be determined as a direction calculated by averaging light intensities of light of a small wavelength range about the particular wavelength, wherein the averaging is performed over the full half-sphere above the surface. Similarly, the direction of emission from the chromatic optics may be determined as an averaged direction into which light of a suitably chosen small wavelength range is emitted from the optics.

Measuring light reflected from the surface of the object and detected by a position sensitive detector will show a wavelength dependent intensity distribution depending on an orientation of the reflecting surface portions of the object relative to the incident light of the plural different wavelengths. Due to the wavelength dependent direction of incidence of the measuring light, a change of the orientation of a surface portion will result in a change of the wavelength of the measuring light reflected from the surface portion into a particular direction.

Thus, by analysing the detected wavelength dependent intensity distributions of the measuring light reflected from the surface of the object, it is possible to determine orientations of surface portions of the object relative to e.g. a predetermined direction. It is then further possible to determine the shape of the surface of the object from the determined orientations of surface portions at the plural locations.

It is thus possible to determine the shape of the surface of the object with a relatively simple measurement, wherein the equipment used for the measurement, such as the illuminating optics, the imaging optics and the light source, is not limited to a particular shape of the surface of the object, and various objects of different shapes may be tested with a same equipment.

According to an embodiment of the invention, the method comprises: generating measuring light of plural different wavelengths; directing the measuring light onto the surface of the object through a chromatic illuminating optics such that the measuring light is incident at plural locations of the surface, wherein, at each said location, a direction of incidence of measuring light of a first wavelength differs from a direction of incidence of measuring light of a second wavelength by more than 1 arcmin; directing a portion of measuring light reflected from the surface of the object onto a light detecting surface of a detector through an imaging optics, wherein more than one third of the reflected measuring light of the plural different wavelengths entering the imaging optics is blocked from being incident on the light detecting surface of the detector; detecting wavelength dependent distributions of an intensity of the measuring light incident on the detector; and determining a shape of the surface of the object based upon the detected wavelength dependent distributions of intensity.

According to an embodiment herein, reflected measuring light reflected from the surface of the object in a particular direction or range of directions is selected for detection by a beam stop having an aperture of a predefined shape. The predetermined shape may be a shape such as a circular shape, a ring shape, a linear slit shape or other.

According to a further embodiment, the method comprises generating measuring light of different wavelengths to be incident on the surface of the object, allowing measuring light emerging from the surface to traverse an imaging optics and detecting a light intensity of each of plural groups of rays of the measuring light having traversed the imaging optics, wherein each group of rays has associated therewith a range of wavelengths of its rays and a range of angles of the rays relative to a predetermined direction. The shape of the surface of the object is determined in dependence of the detected intensities.

The different wavelengths and the design of the chromatic optics are chosen such that, due to a dispersion of the chromatic optics, rays of the measuring light of the different wavelengths are deflected by the optics by sufficiently different angles such that these different angles may be detected. By detecting the light intensities in dependence of the wavelengths and the angle, it is then possible to obtain sufficient information to calculate the shape of the surface from which the measuring light emerges.

In an exemplary embodiment of the invention, only light which emanates from the surface under an angle of 90° is detected, and the imaging optics is a sufficiently chromatic optics. Due to the dispersion of the chromatic imaging optics only one wavelength of the detected light emerging from the surface at a particular position will exactly fulfil the condition of emanation from the surface under 90°. Already by approximately determining this wavelength it is possible to determine the orientation of the surface at that location to a sufficient accuracy, and by performing this calculation for plural locations of the surface it is finally possible to calculate the surface shape of the whole surface with a desired precision.

According to an exemplary embodiment of the invention, the angle of emanation of the detected rays of measuring light is selected by a beam stop having an aperture.

According to an exemplary embodiment of the invention, the selecting of groups of rays having a particular angle comprises using a position-sensitive detector having a plurality of spaced apart detector elements. Each detector element may then detect rays within a small range of angles relative to the predetermined direction.

The selecting of the groups of rays having a particular range of wavelengths may be achieved, according to an exemplary embodiment, by using a light source which allows to adjust a wavelength of the emitted light. This may include using a broad band light source or white light source and a selective filter downstream of the light source wherein the filter allows light of a relatively narrow wavelength range to pass therethrough.

According to an alternative exemplary embodiment, light of a broad wavelength range, such as light from a broad band light source or a white light source, may be incident on the surface to be tested, and a spectral analysis is performed with the measuring light emerging from the surface and having traversed the chromatic imaging optics.

According to an exemplary embodiment, the chromatic imaging optics is also used for directing the generated measuring light onto the surface to be measured.

According to a further exemplary embodiment, the measuring light emerging from the surface is measuring light reflected therefrom. According to an alternative embodiment, the measuring light emerging from the surface is measuring light having traversed the surface of the object.

According to a further exemplary embodiment, the detecting of the light intensities comprises an interferometric detection involving generating reference light which is sufficiently coherent to the measuring light emanating from the surface, and superimposing the reference light with the measuring light emanating from the surface to generate alternating constructive and destructive interferences therebetween.

The invention further provides a method of manufacturing an object having a surface of a target shape using the above method of determining the shape of the surface and processing the surface of the object based on deviations of the determined shape of the surface from its target shape.

The processing of the optical surface may comprise a machining such as milling, grinding, loose abrasive grinding, polishing, ion beam figuring, magneto-rheological figuring, and finishing of the optical surface of the optical element. The processing may also comprise a processing using a hand-held tool or other suitable tool moved directly or indirectly across the surface due to a movement of a hand or arm of an operator.

According to an embodiment, the finishing comprises applying a coating to the optical surface. The coating may comprises a coating such as a reflective coating, an anti-reflective coating and a protective coating.

The invention further provides a system for measuring a shape of a surface of an object, wherein the system comprises: a light source for generating measuring light of plural different wavelengths, a chromatic illuminating optics for directing the measuring light onto the surface of the detector, and a position sensitive detector for detecting measuring light reflected from the surface of the object, and a wavelength selector disposed in a beam path upstream of the detector.

According to an embodiment of the invention, a system for measuring a shape of a surface of an object comprises: a light source for generating measuring light within a broad wavelength range; a chromatic illuminating optics for directing the measuring light onto the surface of the object, wherein the chromatic illuminating optics has a front surface of an optical element disposed closest to the object to be measured, and wherein a dispersion of the chromatic illuminating optics is such that, at each of plural locations on the front surface, an emission direction of measuring light of a first wavelength differs from an emission direction of measuring light of a second wavelength by more than 1 arcmin; an imaging optics for imaging the surface of the object onto a light detecting surface of a detector, wherein the imaging optics comprises a beam stop having an aperture disposed within a beam path of the imaging optics, the aperture having a cross section of a size which is smaller than a third of a size of an effective cross section of the beam path of the imaging optics upstream of the beam stop; and a spectral selector transmitting only measuring light within a narrow wavelength range, wherein the spectral selector is disposed in a beam path of the measuring light between the light source and the detector.

According to a further embodiment of the invention, the system comprises: an imaging optics, a beam stop having an aperture; a test piece mount configured to mount the object such that the surface of the object is positioned relative to the chromatic imaging optics; a position sensitive detector to detect measuring light emerging from the surface of the object and having traversed the imaging optics and the aperture; a light source for generating measuring light within a broad wavelength range; a chromatic illumination optics for directing the measuring light onto the surface; a spectral selector to select an adjustable narrow wavelength range from the broad wavelength range, wherein only the measuring light of the selected narrow wavelength range is incident on the position sensitive detector; and a controller to receive signals representing the light intensities detected by the position sensitive detector and to control the spectral selector such that plural different narrow wavelength ranges are subsequently incident on the detector.

According to an exemplary embodiment, the chromatic optics comprises a hologram or diffractive grating.

According to a further exemplary embodiment, the system comprises an interferometer having a measuring arm and a reference arm wherein the measuring arm includes the imaging optics and the surface to be measured. According to an exemplary embodiment herein, the interferometer is a white light interferometer using light having a coherence length which is shorter than a difference between an optical path of the reference arm and an optical path of the measuring arm of the interferometer.

According to a further exemplary embodiment, the optical surface to be tested is an aspherical surface having substantial deviations from a spherical shape. Within the context of the present application, an optical surface may be referred to as an aspherical surface if the aspherical surface differs from its best approximating sphere by more than a predetermined criterion. One such criterion is based on a gradient of the difference between the aspherical surface and its best approximating sphere, and the optical surface is referred to as an aspherical surface if such gradient exceeds a value of 6 μm divided by an effective diameter of the optical surface.

BRIEF DESCRIPTION OF THE DRAWINGS

The forgoing as well as other advantageous features of the invention will be more apparent from the following detailed description of exemplary embodiments of the invention with reference to the accompanying drawings. It is noted that not all possible embodiments of the present invention necessarily exhibit each and every, or any, of the advantages identified herein.

DETAILED DESCRIPTION OF EXEMPLARY EMBODIMENTS

Figure 1:
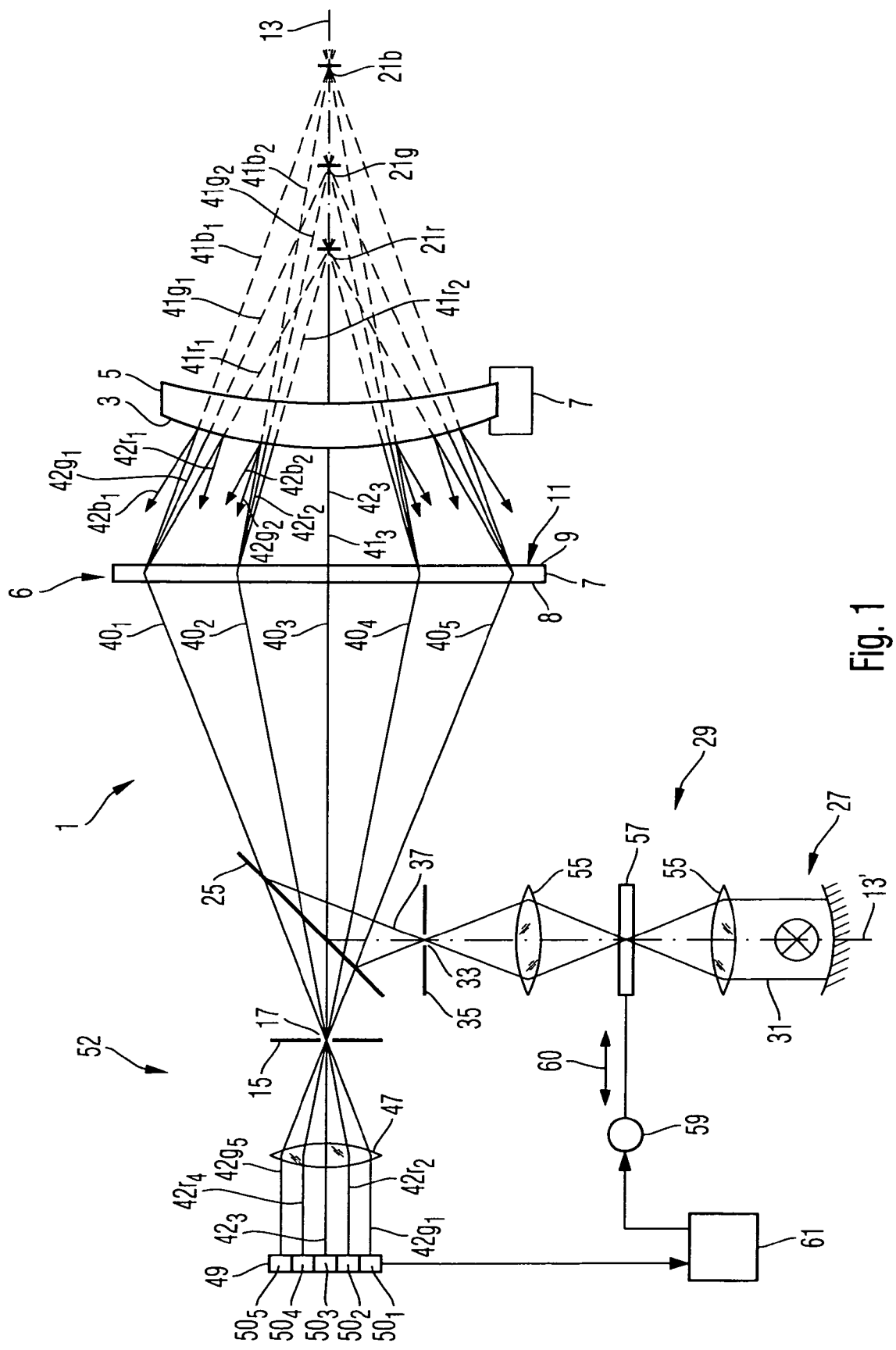
FIG. 1 is a schematic illustration of a system for measuring a shape of a surface according to a first embodiment of the invention.

In the exemplary embodiments described below, components that are alike in function and structure are designated as far as possible by alike reference numerals. Therefore, to understand the features of the individual components of a specific embodiment, the descriptions of other embodiments and of the summary of the invention should be referred to.

FIG. 1 schematically illustrates a system 1 for measuring a shape of a surface 3 of an object 5. In the example shown in FIG. 1 the object is a lens made of glass, and the surface 3 to be measured is a convex surface having an aspherical shape. The invention is not limited to such object, however. The system 1 may be used for measuring other surfaces of optical elements, such as mirror surfaces, concave surfaces, and flat surfaces, and surfaces of other objects of manufacture, such as, for example, components of valves in hydraulic systems or fuel injection systems or others having sufficient specular reflectivity.

The system 1 comprises an imaging optics 6 including a plate 7 having a first surface 8 facing away from the surface 3 of the object 5, and a surface 9 facing towards the object 5. Surface 9 carries a hologram 11 having a grating structure which is rotationally symmetric with respect to an axis 13 of system 1. The object 5 is mounted on a test piece holder 7 at a predetermined position relative to the imaging optics 6.

The system 1 further comprises a beam stop 15 oriented transversely to the axis 13 and having a small aperture 17 which is traversed by axis 13 at its center. The hologram 11 is designed such that red light forms an image of aperture 17 at a location $21r$ on the axis 13, if object 5 is not disposed between location $21r$ and the hologram 11. Red light will also image position $21r$ into the position of the aperture 17, such that aperture 17 and position $21r$ are conjugate to each other with respect to the hologram 11 when using red light. Similarly, FIG. 1 shows a position $21g$ which is conjugate to the aperture 17 with respect to the imaging optics 6 for green light, and a position $21b$ which is conjugate to the position of aperture 17 with respect to the imaging optics 6 for blue light.

It is to be noted that the colours red, green and blue in the description of the embodiments of the present application are chosen for illustrative purposes only and are not intended to limit the present invention to such colours. In fact any other electrical magnetic radiation of a sufficiently broad wavelength range or plural different wavelength ranges may be used as measuring light for practicing the present invention.

In a beam path between beam stop 15 and the imaging optics 6 there is disposed a semitransparent mirror oriented under an angle with respect to the optical axis 13 such that a folded optical axis $13'$ is oriented transversely to axis 13.

A broad band light source 27, such as a halogen lamp, is disposed on axis $13'$, and an illumination optics 29 focuses a light beam 31 emitted from light source 27 onto an aperture 33 provided in a beam stop 35. The illuminated aperture 33 provides a point source of broad band measuring light 37 emitted from a position of the aperture 33. The aperture 33 is disposed on the folded optical axis $13'$ at a position which is conjugate to position $21r$ for red light, and which is conjugate to positions $21g$ and $21b$ for green light and blue light, respectively, and with respect to the imaging optics 6.

Five exemplary rays of measuring light extending under five different angles with respect to axis 13 are indicated in FIG. 1 by reference numerals $40_1$, $40_2$, $40_3$, $40_4$ and $40_5$, wherein ray $40_3$ coincides with axis 13. Due to the chromatic nature of imaging optics 6, beam $40_1$ is, depending on its wavelength, dispersed by hologram 11, and three exemplary dispersed rays $41r_1$, $41g_1$ and $41b_1$ of illuminating ray $40_1$ are illustrated in FIG. 1 for red, green and blue components of ray $40_1$. Reference numerals $42r_1$, $42g_1$ and $42b_1$ indicate reflected rays, wherein reflected ray $42r_1$ is ray $41r_1$ as it is reflected from surface 3, and rays $42g_1$ and $42b_1$ are rays $41g_1$ and $41b_1$, respectively, as they are reflected from surface 3. In the exemplary situation shown in FIG. 1, ray $41g_1$ is orthogonally incident on surface 3, and reflected ray $42g_1$ emerging from surface 3 coincides with ray $41g_1$ which is incident on the surface 3. Due to the dispersive nature of the hologram, the other incident rays $41r_1$ and $41b_1$ are oriented under an angle different from 90° with respect to ray $41g_1$, and these rays $41r_1$ and $41b_1$ are not orthogonally incident on surface 3, such that the corresponding reflected rays $42r_1$ and $42b_1$ emerging from the surface 3 do not coincide with incident rays $41r_1$ and $41b_1$, respectively.

The orthogonally reflected ray $42g_1$ is incident on the hologram 11 and deflected by the hologram such that it coincides with illuminating measuring light ray $40_1$, traverses the semitransparent mirror 25 and the aperture 17 of beam stop 15. Beam $42g_1$ then further traverses a camera optics 47 to be incident on a pixel $50_1$ of a camera chip 49 of a camera 52. The other reflected rays $42r_1$ and $42b_1$ will either not be incident on the hologram 11 such that they are not deflected thereby, or they will be deflected by the imaging optics 6 such that they will not be incident on aperture 17 such that these rays are intercepted by beam stop 15. In the exemplary situation shown in FIG. 1, pixel 51 will detect no other measuring light emerging from surface 3 than green measuring light. In fact, due to the extension of pixel $50_1$ in a lateral direction with respect to the axis 13, pixel $50_1$ will detect light from a narrow range of angles relative to the axis 13 and emanating from a somewhat extended portion of the surface 3 which is then not necessarily exactly monochromatic and may comprise a narrow range of wavelengths about central ray $42g_1$.

Similarly, illuminating ray $40_2$ is dispersed by imaging optics 6 into rays $41r_2$, $41g_2$ and $41b_2$ which are incident onto surface 3 at a location or region which is different from that location where rays $41r_1$, $41g_1$, $41b_1$ are incident on the surface 3. Rays $41r_2$, $41g_2$ and $41b_2$ are reflected from surface 3 to form emerging rays $42r_2$, $42g_2$ and $42b_2$, wherein the surface 3 is oriented, at the location where rays $41r_2$, $41g_2$, $41b_2$ are incident thereon, such that only ray $41r_2$ is orthogonally incident on the surface 3. Reflected ray $42r_2$ coincides with incident ray $41r_2$ and is diffracted by the hologram 11 such that it also coincides with illuminating ray $40_2$. Thus, reflected ray $42r_2$ may traverse the aperture 17 and will be incident on a pixel $50_2$ of detector 49. The other reflected rays $42g_2$ and $42b_2$ will, due to their different angles with respect to the axis 13, not be able to traverse the aperture 17, and pixel $50_2$ will detect red light of a narrow bandwidth only.

Illuminating ray $40_3$ coincides with the optical axis 13, and will not be deflected by the imaging optics 6 such that an incident ray $41_3$ is orthogonally incident on surface 3 for all colour components thereof, and a corresponding reflected ray $42_3$ will traverse the imaging optics 6 and the aperture 17 to be incident on a pixel $50_3$ of detector 52, independent of the colour of that ray. Thus, pixel $50_3$ will detect substantially all colour components of incident ray $40_3$.

The exemplary situation illustrated in FIG. 1 is symmetric with respect to axis 13, such that pixel $50_4$ of detector 49 detects red light of ray $42r_4$, and pixel $50_5$ detects green light of ray $42g_5$.

The illuminating optics 29 comprises collimating lenses 55 and a colour filter 57 disposed therebetween. Such type of colour filter is obtainable for example from SCHOTT, Mainz, Germany. The colour filter 57 is operated by an actuator 59 controlled by a controller 61. The actuator 59 is configured to translate colour filter 57 in a direction 60 transversely to folded axis $13'$ for selecting a central wavelength of a narrow wavelength band which is allowed to traverse colour filter 57. The controller 61 may be computer controlled and programmed to adjust the colour filter 57 subsequently in three different positions such that the measuring light 37 will subsequently be formed of red light, green light and blue light. The controller 61 further receives the patterns detected by detector 52. In the first situation, where the colour filter 57 is positioned such that the measuring light 37 is formed of red light, the controller receives detected light intensities from pixels $50_2$, $50_3$ and $50_4$. In the second situation where the colour filter 57 is positioned such that the measuring light 37 is composed of green light, the controller 61 receives detected intensity information from pixels $50_1$, $50_3$ and $50_5$. In the third situation, where the colour filter 57 is positioned such that the measuring light 37 is formed of blue light, the controller receives detected intensity information only from pixel $50_3$.

From the pattern image information obtained for each respective narrow wavelength band it is possible to determine an orientation of the surface 3 relative to the optical axis 13 at plural locations of the surface 3, and to further calculate the surface shape of surface 3.

In the simplified method illustrated in FIG. 1 fifteen groups of rays traversing the aperture 17 are detected. The fifteen groups result from the five detector elements multiplied by three different colours. Three detector elements detect the green light, three detector elements detect the red light, and one detector element detects the blue light. Thus, only seven groups of rays contribute to a measured intensity. The other groups of rays are intercepted by the beam stop 15. A ratio of the groups contributing to the measured intensity, apart from a detected background intensity, over the total number of groups is less than one half. In the practical embodiment, where a higher resolution of the detector is used and where a higher number of narrow wavelength bands is used for forming a higher number of groups of rays, this ratio will be even more reduced.

The system 1 is not limited to measuring objects having surfaces of exactly the same aspherical shape as illustrated in FIG. 1. Moreover, it is possible to place other objects in the beam path of the imaging optics 6. Such surfaces of other shapes will have other orientations relative to axis 13 at locations imaged onto the pixels of the detector, resulting in different colour patterns detected by detector 52. From these different colour patterns, also different surface shapes may be calculated.

The determination of various aspherical surface shapes is possible with one single imaging optics and without a necessity of a high precision translation of the surface relative to the imaging optics.

The measuring system 1 illustrated in FIG. 1 is exemplary also in that sense that the detector comprises only five pixels and that the measurement is performed for only three different wavelengths. In a practical embodiment, the detector will be a two-dimensional position sensitive detector with a higher resolution, such as 1024×1024 pixels, and the measuring light will be adjusted to a higher multitude of different narrow wavelength bands, such as some hundred different wavelength bands, and a detector image is obtained by the controller for each respective wavelength band to calculate the surface shape with a high accuracy.

The hologram 11 may be generated by exposing a photographic plate to reference light and light reflected from a spherical surface, or, the hologram may be a computer generated hologram (CGH) generated by calculating a corresponding grating using a computer, involving methods such as ray tracing and plotting the calculated grating on surface 9 of the plate 7. The grating may be formed by a lithographic method, for example. Background information with respect to holograms used in interferometry may be obtained from Chapter 15 of the above mentioned text book of Daniel Malacara.

Figure 2:
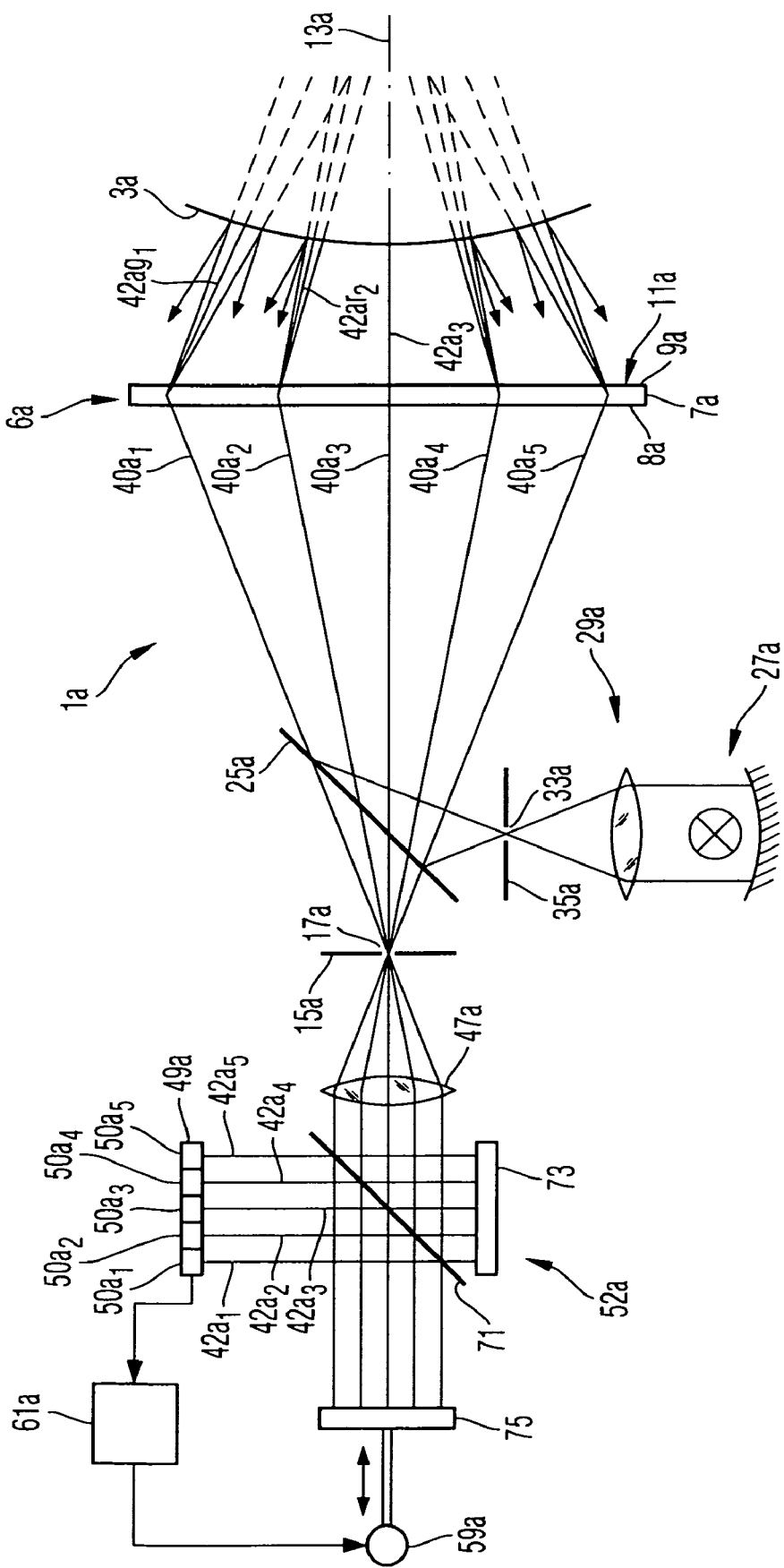
FIG. 2 is a schematic illustration of a system for measuring a shape of a surface according to a second embodiment of the invention.

FIG. 2 illustrates a further exemplary system 1a for determining a shape of a surface 3a, wherein the system 1a is similar to the system shown in FIG. 1. In particular, a measuring optics 6a of the system and the surface 3a are identical to the situation shown in FIG. 1. The systems of FIG. 1 and FIG. 2 differ in that the system 1a illuminates the surface 3a with white illumination light of a broad wavelength band, and that a necessary wavelength selection is performed at a detector 52a. An illumination optics 29a does not comprise a colour filter, such that light of a white light source 27a is directly focused onto an aperture 33a of a beam stop 35a.

The colour selection is performed by using a Fourier spectrometer camera 52a comprising a beam splitter 71 splitting reflected rays $42a_1 \ldots 42a_5$ originating from surface 3a such that one split portion of these rays is incident on a fixed mirror 73 and an other split portion of these rays is incident on a movable mirror 75. The rays reflected from mirrors 73 and 75 are recombined by beam splitter 71 and incident on detector elements $15a_1, \ldots, 15a_5$ of a detector chip 49a. The movable mirror 75 is displaced by an actuator 59a controlled by a controller 61a. A wavelength analysis of reflected rays $42a_1 \ldots 42a_5$ is performed by displacing the movable mirror 75 under the control of the controller 61a, according to the principles of the Fourier spectrometer camera to determine wavelengths of the measuring light reflected from the different locations on the optical surface 3a.

Figure 3:
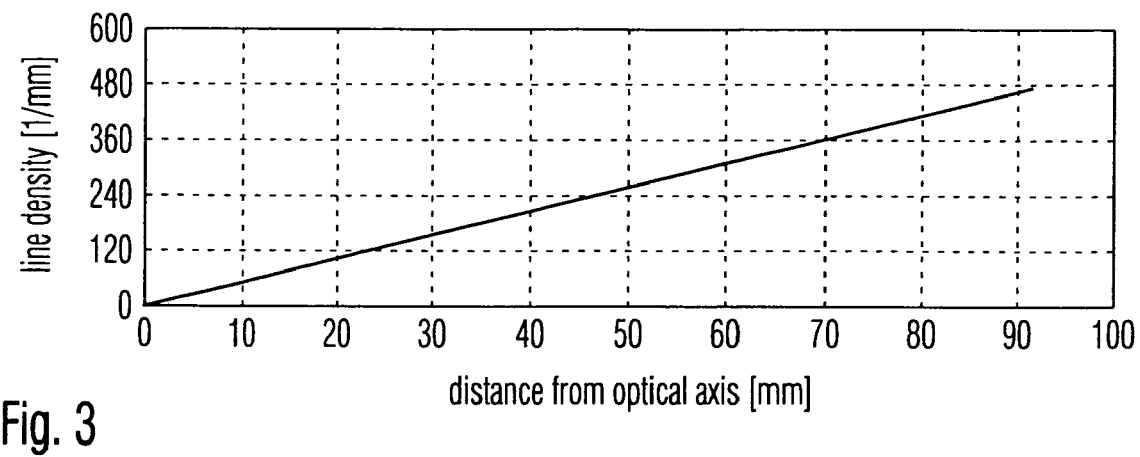
FIG. 3 is a graph illustrating a line density of a hologram used in a system similar to that shown in FIG. 2.

FIG. 3 shows a graph representing a line density of the hologram 11a of the imaging optics 6a shown in FIG. 2 as a function of a distance from axis 13a.

Figure 4:
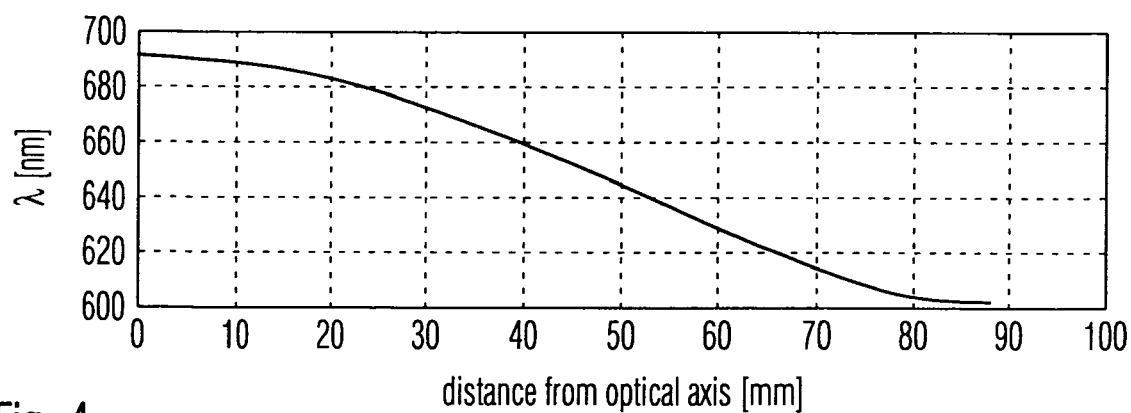
FIG. 4 shows a graph representing a wavelength of measuring light incident on a detector in dependence of its perspective position on the surface to be tested.

FIG. 4 shows a graph representing a wavelength of the light detected by spectrometer camera 52a as a function of an angle relative to axis 13a and represented as the distance from the axis 13a on the hologram 11a imaged onto the detector 59a.

Figure 5:
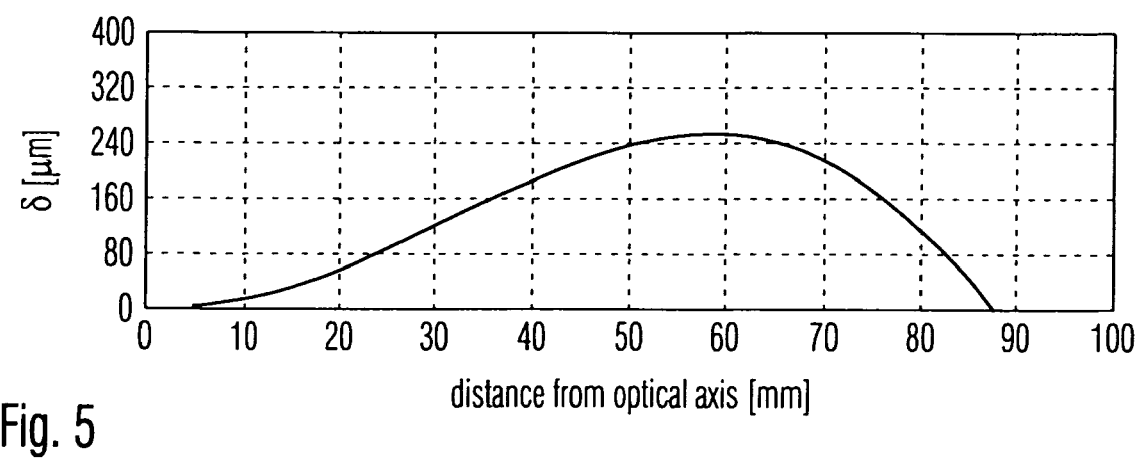
FIG. 5 shows a graph representing a shape of the surface calculated from the intensities shown in FIG. 4.

FIG. 5 shows a graph representing a surface shape of the surface 3a as a function of the distance from the optical axis 13a. The surface shape is represented as a deviation Δδ from a spherical shape having a radius of curvature of 278.2 mm. The surface has a diameter of 175.0 mm.

In the embodiments shown in FIGS. 1 and 2 the detected measuring light emanating from the surface to be tested is light, which is directly reflected from the surface to be tested.

Figure 6:
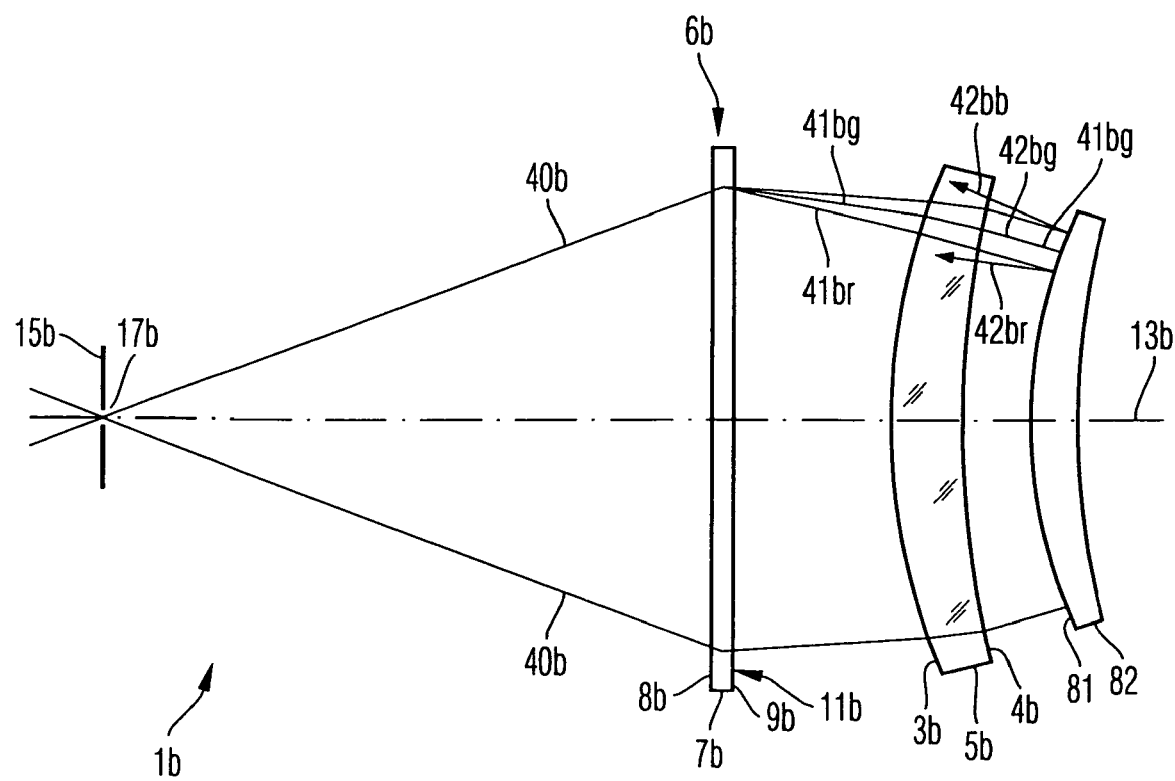
FIG. 6 is a schematic illustration of a portion of a system for measuring a shape of the surface of an object according to a third embodiment of the invention.

FIG. 6 schematically illustrates a portion of a system 1b for measuring a shape of a surface 3b of a lens 5b wherein the measuring light traverses surface 3b to be tested. In detail, an illuminating beam of measuring light 40b is generated by an illuminating optics 6b similar to that shown in FIG. 1 or 2. The illuminating beam 40b is dispersed by a hologram 11b provided on a plate 7b and the dispersed light 41br, 41bg and 41bb traverses surface 3b to be tested and emerges from the lens 5b through a rear surface 4b thereof. Thereafter, the dispersed beams are incident on a mirror 82 having a reference surface 81 of a previously known shape. Due to the dispersing function of the hologram 11b, the incident rays 41br, 41bg and 41bb are incident on the reference mirror surface 81 at different angles. In the exemplary illustration of FIG. 6, only the ray 41bg is orthogonally incident on mirror 81 such that the reflected ray 42bg coincides with the incident ray 41bg and may travel back through the imaging optics 6b and traverses the aperture 17b to be detected by a detector, not shown in FIG. 6. Both the incident ray 41bg and the ray 42bg reflected from mirror 81 which traverse the lens 5b again and finally emerges from surface 3b are deflected by surface 3b, and a change in the inclination of the surface 3b with respect to 13b will change the colour of measuring light emerging from the surface 3b such that it traverses the aperture 17b.

Figure 7:
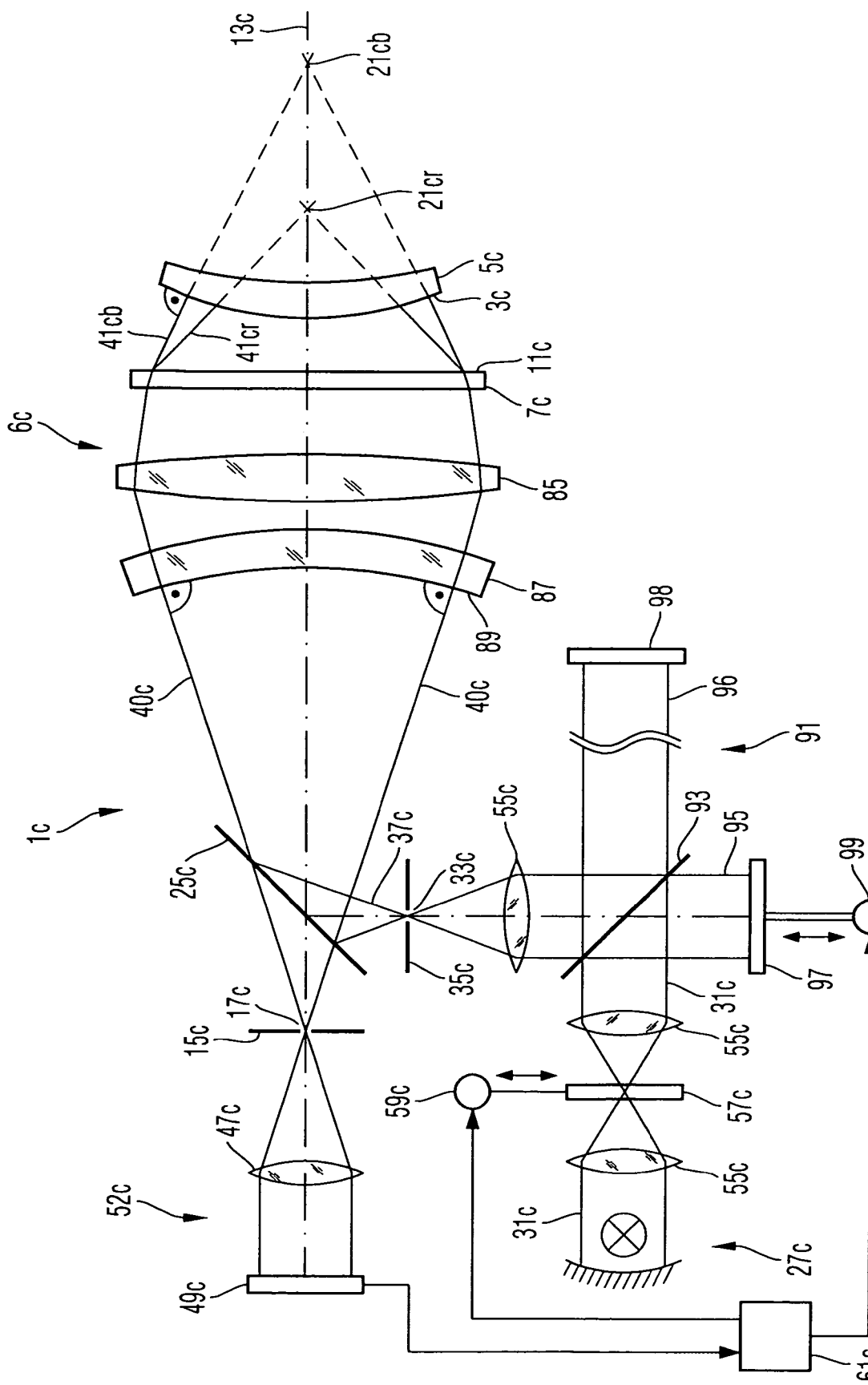
FIG. 7 is a schematic illustration of a system for measuring a shape of a surface according to a fourth embodiment of the invention.

FIG. 7 schematically illustrates a system 1c for measuring a shape of a surface 3c of an object 5c, wherein the system combined the advantages of a chromatic imaging optics 6c with advantages of an interferometric measuring principle.

The chromatic imaging optics 6c comprises both diffractive and refractive elements. A diffractive element having a relatively strong dispersive effect on measuring light is provided by a hologram 11c carried on a plate 7c. The refractive elements which may also contribute to dispersion of the measuring light are provided by two lenses 85 and 87 wherein lens 87 provides a Fizeau surface 89 of a constant curvature having a center of curvature at a position of an aperture 17c provided in a beam stop 15c. A portion of a beam 37c of measuring light is reflected from the Fizeau surface 89, traverses aperture 17c and is incident on a detector 49c. A portion of the measuring light not reflected from Fizeau surface 89 further traverses the imaging optics 6c and is dispersed thereby to be incident on surface 3c to be tested. Those colours of the incident measuring light 41c which are orthogonally incident on surface 3c will be reflected therefrom such that they coincide with the incident light in such a way that they may traverse the aperture 17c to be also incident on the detector 49c. On the detector, the light reflected from the reference Fizeau surface 89 and the light reflected from the surface 3c to be tested will form an interference pattern which is analysed by a controller 61c. A colour selection of the detected light is performed by a colour filter 57c provided in the illumination beam path of the illuminating light 37c such that the colour selection is performed before the measuring light is incident on the surface 3c to be tested. Since the light source is a broadband light source, a coherence length of the generated light is relatively short, and in particular shorter than a distance between the Fizeau surface 89 and the surface 3c to be tested.

To obtain interference between light reflected form the Fizeau surface and light reflected from the surface to be tested, an optical delay arrangement 91 is provided in the illuminating beam path. The delay arrangement 91 comprises a beam splitter 93 for separating a light beam 31c generated by the light source 27c into two light beams 95 and 96, which are each incident on a respective mirror 97 and 98, and recombined by beam splitter 93 after reflection from mirrors 97 and 98 respectively. The recombined light is focused by a collimator 55c onto an aperture 33c to provide a point source of illuminating measuring light 37c. An actuator 99 is controlled by controller 61c to displace mirror 97 in a direction of beam 95 to such an extent that a difference between an optical path between beam splitter 93 and mirror 97 and an optical path between beam splitter 93 and mirror 98 corresponds to an optical path difference between Fizeau surface 98 and surface 3c to be tested at those locations where the incident rays 41c of a colour currently adjusted by colour filter 57c are orthogonally incident on surface 3c.

Other than in conventional systems using white light interferometry, the system 1c shown in FIG. 7 may be used for testing surfaces 3c of various shapes since the dispersive measuring optics 6c allows fulfilment of the interference condition for various angles of incidence of measuring light onto the surface to be tested.

In the embodiment illustrated with reference to FIG. 7 above, the optical delay arrangement 91 is disposed in a beam path of the illuminating light. It is however possible to provide a corresponding arrangement in a beam path between the measuring optics 6c and the detector arrangement 52c.

Figure 8:
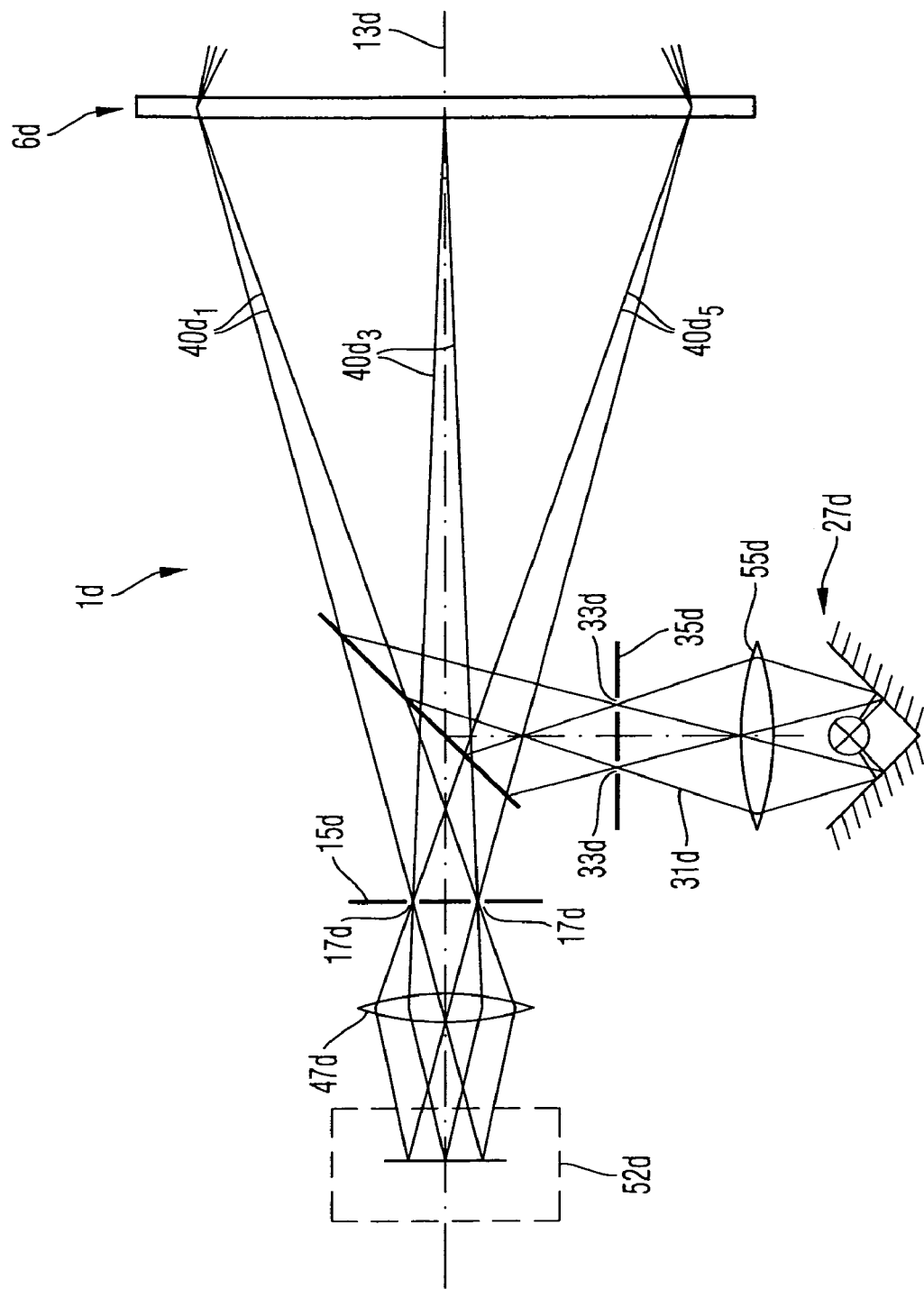
FIG. 8 is a schematic illustration of a system for measuring a shape of a surface according to a fifth embodiment of the invention.

FIG. 8 schematically illustrates a portion of a further embodiment of a system 1d for measuring a shape of a surface. The system 1d differs from the embodiments illustrated above mainly in that a beam stop 15d provided upstream of a colour sensitive camera 52d has a ring shaped aperture 17d rather than a circular central aperture. Similarly, a beam stop 25d provided in an illuminating light beam 31d has a corresponding ring shaped aperture 33d. With such arrangement, plural illuminating and imaging rays 40d intersect the chromatic imaging optics 6d at different angles. In particular, rays 40d₃ incident on the chromatic imaging optics 6d on an axis of symmetry 13d will be incident thereon under an angle different from zero. If the imaging optics 6d is embodied as a hologram, this will have an advantage of an increased diffractive power in a region close to the axis of symmetry as compared to the embodiments illustrated above.

In other embodiments, the shape of the apertures is different from the ring shaped aperture and comprise shapes such as an extended line, a square, an ellipsoid or others. Further, it is possible to use light sources of various shapes corresponding to the shape of the aperture upstream of the detector, such as ring shaped light sources, extended line shaped light sources and others.

In the above illustrated embodiments, the dispersion necessary for obtaining the different directions of incidence of different wavelengths onto the surface to be tested is mainly generated by an optical element, such as a grating, disposed in a portion of the optics which is traversed by both the illuminating beam and the imaging beam or, in other words, in a beam path between the light source and the object and in a beam path between the object and the detector.

Figure 9:
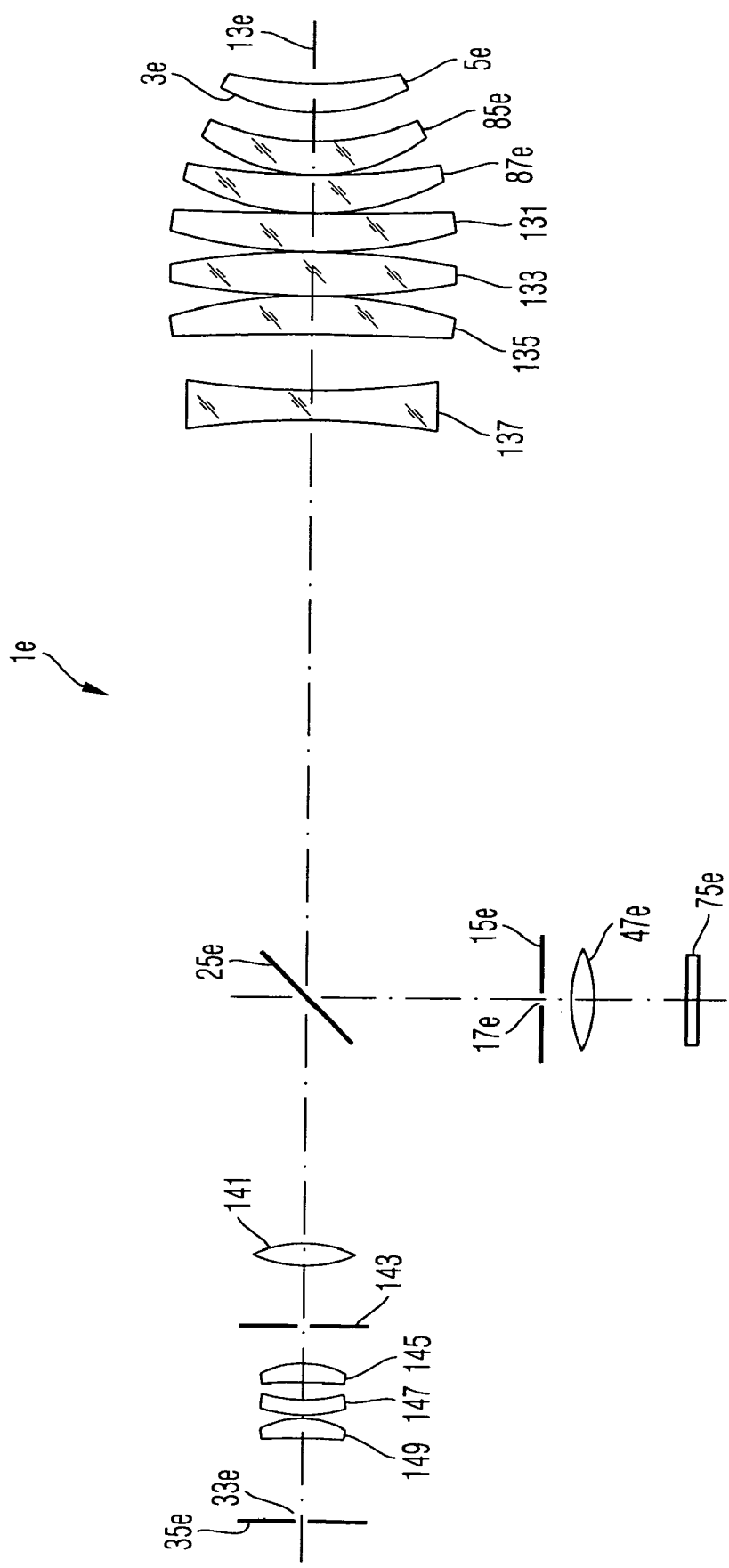
FIG. 9 is a schematic illustration of a system for measuring a shape of a surface according to a sixth embodiment of the invention.
Figure 10:
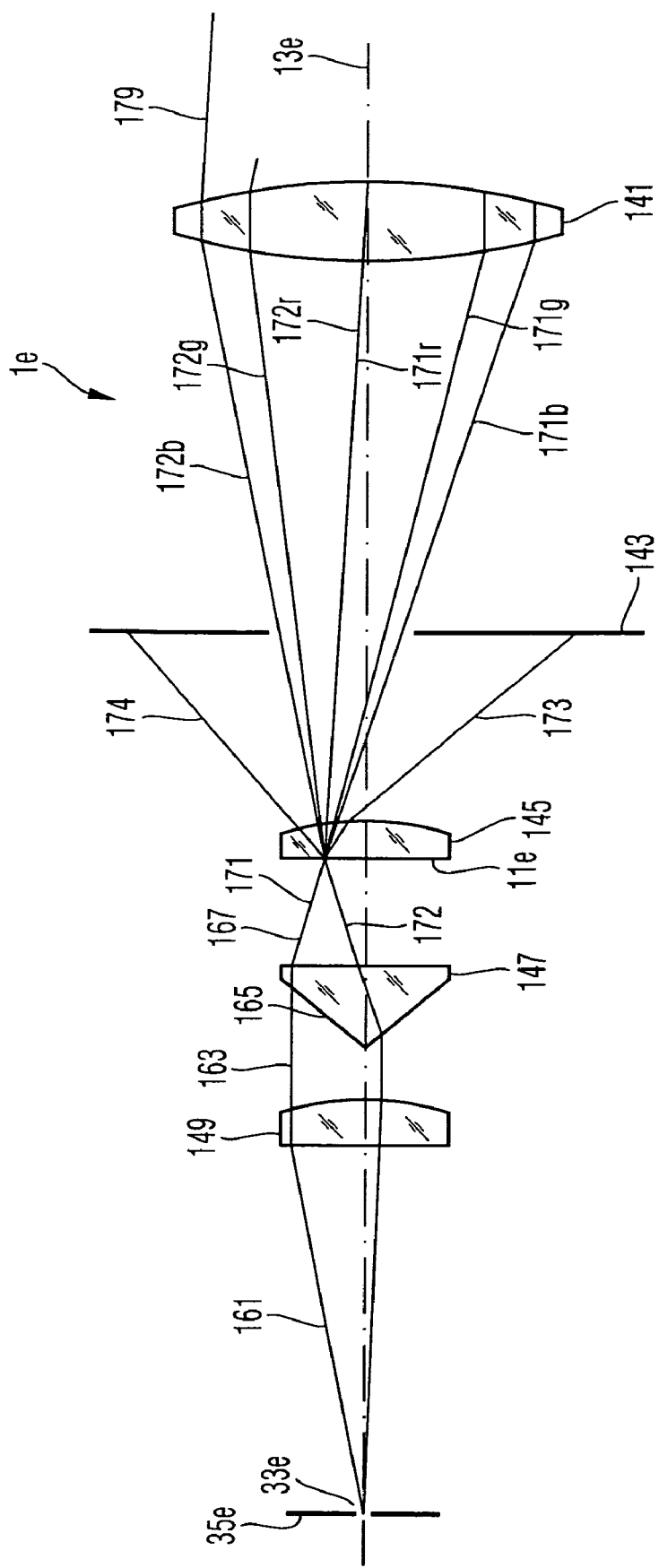
FIG. 10 is an enlarged schematic illustration of a portion of the system shown in FIG. 10.
Figure 11:
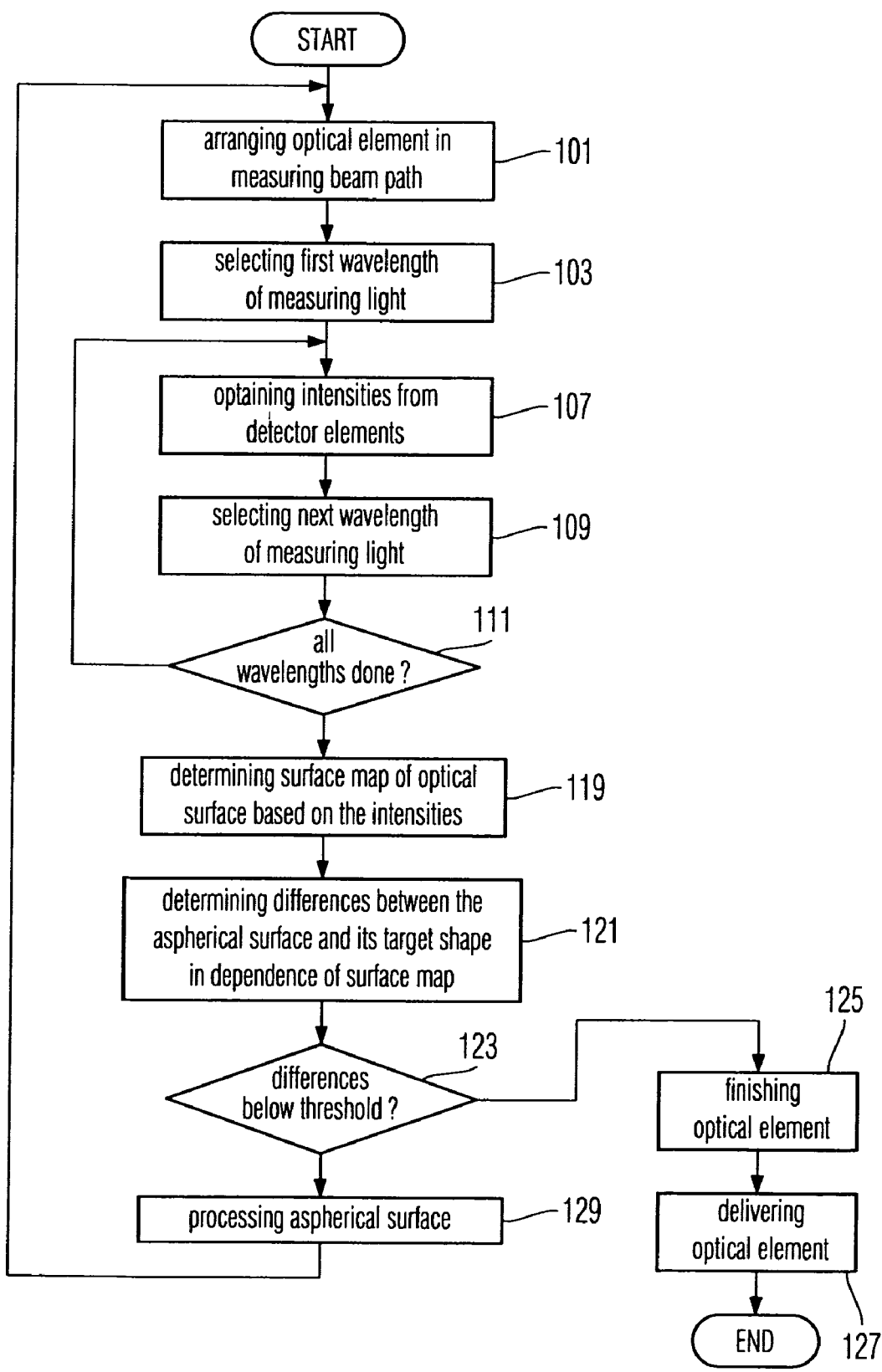
FIG. 11 is a flow chart of a method for manufacturing the optical element according to the invention.

With reference to FIGS. 9 and 10, a system 1e for measuring a shape of a surface 3e will be illustrated in which the dispersion is generated outside of a beam path between the surface to be tested and a detector. Thus, the illuminating optics is a significantly chromatic illuminating optics, and the imaging optics has, compared to the chromatic illuminating optics, a low dispersion.

The dispersion generating portion of the illuminating optics is shown in FIG. 10 in detail.

A diverging beam 161 is emitted from a pinhole 33e of a beam stop 35e. Beam 161 comprises plural different wavelengths generated at the same time or generated subsequently in time. The different wavelengths are illustrated for the purposes of illustrating the present embodiment as red, green and blue. Beam 161 is collimated by a lens 141 to form a parallel beam 163 which is incident on a conical surface 165 of a lens 147. A beam 167 having traversed conical lens 147 is incident on a computer generated hologram 11e carried on a lens 145. FIG. 10 shows two exemplary rays 171 and 172 of beam 167 which are incident on a same location of the hologram 11e. Reference numeral 173 indicates a +1 diffracted order of ray 171, and reference numeral 174 indicates a +1 diffracted order of ray 172. The beams of these orders of diffraction are blocked by a beam stop 143.

Rays 171r, 171g and 171b indicate red, green and blue rays, respectively, diffracted under the −1 diffraction order of ray 171, and reference numerals 172r, 172g and 172b indicate corresponding red, green and blue rays, respectively, of ray 172 diffracted in the −1 order.

It is apparent that a beam cross section of a beam 179 of measuring light emitted from lens 141 has a particular colour distribution of the measuring light traversing such cross section. Red light traverses such cross section at a center on an optical axis 13e, green light traverses such cross section in a ring shaped portion about the red light portion, and blue light traverses such cross section in a ring shaped portion outside of the green light ring portion.

The light emitted from lens 141 enters the optics formed by lenses 85e, 87e and 131 to 137. Referring to FIG. 9, the lens 141 may be understood as an extended light source for illuminating the optics of lenses 85 to 137, wherein the cross section of the extended light source 141 has colour coded ring shaped light emitting portions.

From such arrangement it is further apparent that each location on aspherical surface 3e to be tested is illuminated with measuring light of plural colours, wherein directions of incidence of the plural colours are different from each other.

The optics of lenses 85e to 137 is further a portion of an imaging optics further comprising lens 47e and beam stop 15e having a ring shaped aperture 17e. The imaging optics is used for imaging the aspherical surface 3e onto a detector 75e without incurring substantial dispersion.

FIG. 9 does not show a spectral selector of system 1e. However, a selector similar to filter 57 of FIG. 1 may be disposed between a light source for illuminating pinhole 33e and beam stop 35e, or the camera 75e which is schematically indicated in FIG. 9 may comprise a wavelength selector, such as a Fourier spectrometer as shown in FIG. 2.

Optical data of the main optical components of the system 1e indicated in table 1 below.

TABLE 1

| Lens | Radius | Thickness | Glass | Semi-Diameter |
|---|---|---|---|---|
|  | infinity | 100.000 |  | 0.000 |
| 149 | infinity | 15.000 | SUPRASIL | 16.501 |
|  | −51.046 | 10.000 |  | 17.834 |
| 147 | 0.001 | 15.000 | SUPRASIL | 17.876 |
|  | infinity | 47.000 |  | 16.934 |
| hologram | infinity | 0.000 |  | 11.355 |
| 145 | infinity | 10.000 | SUPRASIL | 20.000 |
|  | −80.000 | 70.000 |  | 20.000 |
| stop | infinity | 90.000 |  | 60.000 |
| 141 | 154.000 | 20.000 | SUPRASIL | 50.000 |
|  | −154.000 | 1440.000 |  | 50.000 |
| 137 | −617.238 | 23.900 | BK7 | 115.000 |
|  | 896.420 | 92.010 |  | 120.000 |
| 135 | −1432.900 | 41.600 | BK7 | 138.000 |
|  | −578.776 | 2.000 |  | 144.000 |
| 133 | 1204.540 | 52.400 | PBM2 | 148.000 |
|  | −888.920 | 2.000 |  | 149.000 |
| 131 | 523.339 | 45.000 | PBM2 | 148.000 |
|  | infinity | 2.000 |  | 144.000 |
| 87e | 267.460 | 45.000 | PBM2 | 136.000 |
|  | 587.214 | 2.000 |  | 128.000 |
| 85e | 144.757 | 50.000 | SUPRASIL | 112.000 |
|  | 185.133 | 0.000 |  | 98.000 |

In the embodiments illustrated above, the imaging optics is rotationally symmetric with respect to an axis. It is, however, possible to use imaging optics which are not rotationally symmetric and which have, in particular, a non-rotationally symmetric dispersive function on the measuring light. For instance, a hologram may comprise a carrier frequency to improve separation of different diffraction orders. In particular, a beam of measuring light incident on an axis of rotation of the surface to be tested will then be dispersed according to its wavelengths.

The systems and methods for measuring a shape of a surface illustrated with reference to FIGS. 1 to 6 above may be advantageously used in a manufacture of an optical element having an optical surface manufactured to a high accuracy.

A method of manufacturing the optical surface to a high accuracy using a system as illustrated above is illustrated with reference to the flowchart shown in FIG. 9. After starting the procedure, the optical element is arranged in the beam path of the beam of measuring light in a step 101. A first wavelength of the light is selected for the measurement in a step 103. A first measurement is taken in a step 107 by reading out detected light intensities from the detector. Thereafter, a decision 111 is made to determine whether measurements have been performed at all desired wavelengths. If not, processing is continued at step 107 to repeatedly take further measurements at step 107 and selecting further wavelengths at step 109. After completing the measurements in decision step 111, a surface map of the optical surface is determined in a step 119. This determination of the surface map is based on the measurements of the optical surface 3.

Differences between the measured shape of the optical surface and its target shape are calculated in a step 121, based on the surface map determined in step 119. In a step 123, a decision is made as to whether the tested aspherical surface corresponds to the specification for the finished optical surface. If the differences are below suitably chosen thresholds, a finishing step 125 is performed on the optical surface. The finishing may include a final polishing of the surface or depositing a suitable coating, such as a reflective coating, an anti-reflective coating, and a protective coating applied to the optical surface by suitable methods, such as sputtering. The reflective coating may comprise, for example, a plurality of layers, such as ten layers of alternating dielectric materials, such as molybdenum oxide and silicon oxide. Thicknesses of such layers may be about 5 nm and will be adapted to a wavelength to be reflected from the optical surface, such that a reflection coefficient is substantially high. Finally, the reflective coating may be covered by a protective cap layer for passivating the reflective coating. The cap layer may include a layer formed by depositing materials such as ruthenium. The anti-reflective coating which is intended to reduce reflections of radiation from the optical surface of the optical element, such as a lens element, may include materials, such as magnesium fluoride, lanthanum oxide and other suitable materials. Also the anti-reflective coating may be passivated by a protective cap layer.

If the determined differences are below the thresholds in step 123, the procedure is continued at a step 129 of processing the optical surface. For this purpose, the optical element is removed from the beam path of the interferometer optics and mounted on a suitable machine tool to remove those surface portions of the optical surface at which differences between the determined surface shape and the target shape exceed the threshold. Thereafter, the procedure is continued at step 101 and the optical element is again mounted in the beam of measuring light in the interferometer system, and the measurement of the surface shape of the optical surface, determining differences from the target shape and processing is repeated until the differences are below the thresholds.

The processing may include operations such as milling, grinding, loose abrasive grinding, polishing, ion beam figuring and magneto-rheological figuring.

After the optical surface is finished in step 125, the optical element is delivered and incorporated in an optical system in a step 127. Thereafter a next optical element to be tested is mounted in the interferometer beam path in a step 101 and repeated measuring and machining of such next surface is performed until this surface fulfils the specifications.

The above threshold values will depend on the application of the optical surface in the optical system for which it is designed. For example, if the optical surface is a lens surface in an objective for imaging a reticle structure onto a resist with radiation of a wavelength $\lambda=193$ nm, such threshold value may be in a range of about 1 nm to 10 nm, and if the optical surface will be used as a mirror surface in an imaging objective using EUV (extreme ultraviolet) radiation with a wavelength of $\lambda=13.5$ nm, the threshold value will be in a region of about 0.1 nm to 1.0 nm. It is to be noted that it is not necessary that the above mentioned threshold is a constant threshold over the whole area of the optical surface. It is possible that the threshold is dependent on e.g. a distance from a center of the optical surface or some other parameters. In particular, plural thresholds may be defined each for different ranges of spatial frequencies of differences between the measured surface and its target shape.

Using an embodiment of an interferometer system it is possible to test optical surfaces of various shapes with same illumination and imaging optics of the interferometer system. For example, two different optical surfaces can be disposed at respective measuring positions relative to the illumination optics, wherein orientations of the two optical surfaces at corresponding locations may differ by more than arcsin (λmin/2p), wherein λmin is a smallest wavelength of the measuring light and p is a pitch of detector pixels of the detector. In this context, the term corresponding locations should be understood as follows: If the first optical surface is disposed at a measuring position, a first location on the first optical surface is imaged onto a selected location on the detector. If, thereafter, the second optical surface is disposed at a measuring position, a second location on the second optical surface is imaged onto the same selected location on the detector. Since the first location on the first optical surface and the second location on the second optical surface are both imaged onto the same selected location on the detector, the first location on the first optical surface and the second location on the second optical surface are referred to as corresponding locations on the first and second optical surfaces.

For example, the detector may have 1000 times 1000 pixels. The first and second surfaces may each have a diameter of 200 mm, which are imaged onto the full surface of the detector. The pitch of the detector pixels then corresponds to the ratio of the diameter of the optical surfaces over the number of pixel in one direction, which is 200 mm/1000. The shortest wavelength used for measuring is, according to this example, 600 nm. Thus, the difference in orientations of the first and second surfaces at corresponding locations may be more than arcsin (0.6 µm/(2*200 mm/1000))=0.086°.

In the above illustrated embodiments, the interferometer system is of a Fizeau-type. It is to be noted, however, that the invention is not limited to such type of interferometer. Any other type of interferometer, such as a Twyman-Green-type of interferometer, examples of which are illustrated in chapter 2.1 of the text book edited by Daniel Malacara, Optical Shop Testing, 2nd edition, Wiley interscience Publication (1992), a Michelson-type interferometer, examples of which are illustrated in chapter 2.1 of the text book edited by Daniel Malacara, a Mach-Zehnder-type of interferometer, examples of which are illustrated in chapter 2.6 of the text book edited by Daniel Malacara, a point-diffraction type interferometer, examples of which are illustrated in U.S. Pat. No. 5,548,403 and in the article "Extreme-ultraviolet phase-shifting point-diffraction interferometer: a wavefront metrology tool with subangstrom reference-wave accuracy" by Patrick P. Naulleau et al., Applied Optics-IP, Volume 38, Issue 35, pages 7252 to 7263, December 1999, and any other suitable type of interferometer may be used.

In the above illustrated embodiments, the object to be tested is a high-precision optical element, such as a lens or a mirror. It is, however, also possible to apply the concept of the present invention to testing of other objects of manufacture. For example, the disclosed system and method may be used for testing a shape of a valve seat in automotive engineering.

Summarized, a system and method for determining a shape of a surface comprises a chromatic optics for generating a dispersion in a measuring light. Colour information contained in measuring light emerging from the surface to be tested and received by a detector may be used to determine the shape of the surface to tested.

While the invention has been described with respect to certain exemplary embodiments thereof, it is evident that many alternatives, modifications and variations will be apparent to those skilled in the art. Accordingly, the exemplary embodiments of the invention set forth herein are intended to be illustrative and not limiting in any way. Various changes may be made without departing from the spirit and scope of the present invention as defined in the following claims.

The invention claimed is:

1. A method of determining a shape of a surface of an object, the method comprising:
    generating measuring light of different wavelengths to be incident on the surface of the object from different directions of incidence;
    allowing measuring light emerging from an extended region of the surface to traverse an imaging optics;
    detecting a light intensity of each of plural groups of rays of the measuring light having traversed the imaging optics, wherein each group of rays has associated therewith a range of wavelengths of its rays and a range of angles of the rays relative to a predetermined direction, wherein the groups are selected such that the detected light intensities of less than one half of all the groups are greater than twice a background intensity; and
    determining a shape of the extended region of the surface of the object based upon the detected intensities.

2. The method according to claim 1, wherein the detecting of light intensities comprises allowing only a portion of the measuring light having traversed the imaging optics to traverse an aperture provided in a beam stop, and detecting light intensities of the portion of the measuring light having traversed the aperture.

3. The method according to claim 1, wherein the selecting of groups of rays comprises using a position sensitive detector having a plurality of spaced apart detector elements.

4. The method according to claim 1, wherein the generating of the measuring light to be incident on the surface of the object comprises directing the measuring light through the imaging optics.

5. The method according to claim 4, wherein the measuring light emerging from the surface is measuring light reflected from the surface.

6. The method according to claim 1, wherein the measuring light includes plural different wavelengths and wherein the measuring light, including the plural different wavelengths, is incident at plural locations of the surface simultaneously.

7. A method of determining a shape of a surface of an object, the method comprising:
    generating measuring light of different wavelengths to be incident on the surface of the object from different directions of incidence;
    detecting wavelength dependent distributions of an intensity of the measuring light reflected from the object; and
    determining a shape of the surface of the object based upon the detected wavelength dependent distributions of intensity.

8. The method according to claim 7, wherein the detecting comprises detecting the wavelength dependent distributions of the intensity of the measuring light which is reflected from the object and which has traversed an aperture of a beam stop configured to block at least one half of the measuring light reflected from the object to be detected.

9. The method according to claim 7, wherein the measuring light includes plural different wavelengths and wherein the measuring light, including the plural different wavelengths, is incident at plural locations of the surface simultaneously.

10. A system for measuring shapes of surfaces of objects, the system comprising:
    a light source for generating measuring light within a wavelength range;
    an illuminating optics for directing the measuring light onto a surface of an object;
    an imaging optics for imaging the surface of the object onto a light detecting surface of a detector;

wherein the illuminating optics and the imaging optics are configured such that first and second objects comprising first and second aspherical optical surfaces, respectively, are insertable into the system relative to the illuminating optics, wherein corresponding locations of the first and second aspherical optical surfaces are imaged onto same locations on the light detecting surface of the detector, and wherein orientations of the first and second aspherical surfaces at the corresponding locations differ by more than arcsin ($\lambda$min/2p);

wherein $\lambda$min is a smallest wavelength of the measuring light, and p is a pitch of detector pixels in the light detecting surface of the detector.

11. A method of determining a shape of a surface of an object, the method comprising:

generating measuring light of plural different wavelengths;

directing the measuring light onto the surface of the object through an illuminating optics such that the measuring light is incident at plural locations of the surface, wherein, at each said location, a direction of incidence of measuring light of a first wavelength differs from a direction of incidence of measuring light of a second wavelength by more than 1 arcmin;

directing a portion of measuring light reflected from the surface of the object onto a light detecting surface of a detector through an imaging optics, wherein more than one third of the reflected measuring light of the plural different wavelengths entering the imaging optics is blocked from being incident on the light detecting surface of the detector;

detecting wavelength dependent distributions of an intensity of the measuring light incident on the detector; and determining a shape of the surface of the object based upon the detected wavelength dependent distributions of intensity.

12. The method according to claim 11, wherein the reflected measuring light entering the imaging optics is blocked from being incident on the light detecting surface of the detector by a beam stop having an aperture of a predefined shape.

13. The method according to claim 11, wherein the measuring light of the plural different wavelengths is incident on the surface of the object at a same time, and wherein the detecting of the wavelength dependent distributions of intensity comprises a spectral analysis of the measuring light having traversed the imaging optics.

14. The method according to claim 11, wherein the measuring light of the plural different wavelengths is incident on the surface of the object at a same time, and wherein the detecting of the wavelength dependent distributions comprises subsequent detection of distributions of an intensity of the measuring light at the different wavelengths.

15. The method according to claim 11, wherein the generating of the measuring light of plural different wavelengths comprises generating of the measuring light of a single wavelength range at a time and subsequently changing the wavelength range of the generated measuring light.

16. The method according to claim 11, wherein the illuminating optics and the imaging optics each have plural optical elements, and wherein at least one optical element is a component of both the illuminating optics and the imaging optics.

17. The method according to claim 11, wherein the illuminating optics comprises a diffractive grating.

18. The method according to claim 17, wherein the diffractive grating is a component of both the illuminating optics and the imaging optics.

19. The method according to claim 17, wherein the diffractive grating is disposed outside of the imaging optics.

20. The method according to claim 11, wherein the illuminating optics has a beam cross section at a position of a beam path of the measuring light to be incident on the surface of the object, wherein measuring light of different non-overlapping wavelength bands traverses the beam cross section in respective different non-overlapping regions of the cross section.

21. The method according to claim 11, wherein the non-overlapping regions of the cross section are ring shaped.

22. The method according to claim 11, wherein directing the measuring light onto the surface of the object through the illuminating optics such that the measuring light is incident at plural locations of the surface is carried out such that the measuring light, including the plural different wavelengths, is incident at plural locations of the surface simultaneously.

23. A method of manufacturing an object having a surface of a target shape, the method comprising:

generating measuring light of plural different wavelengths;

directing the measuring light onto the surface of the object through an illuminating optics such that the measuring light is incident at plural locations of the surface, wherein, at each said location, a direction of incidence of measuring light of a first wavelength differs from a direction of incidence of measuring light of a second wavelength by more than 1 arcmin;

directing a portion of measuring light reflected from the surface of the object onto a light detecting surface of a detector through an imaging optics, wherein more than one third of the reflected measuring light of the plural different wavelengths entering the imaging optics is blocked from being incident on the light detecting surface of the detector;

detecting wavelength dependent distributions of an intensity of the measuring light incident on the detector;

determining deviations of a shape of the surface of the object based upon the detected wavelength dependent distributions of intensity; and processing the surface of the object based on the determined deviations.

24. The method according to claim 23, wherein the reflected measuring light entering the imaging optics is blocked from being incident on the light detecting surface of the detector by a beam stop having an aperture of a predefined shape.

25. The method according to claim 23, wherein the measuring light of the plural different wavelengths is incident on the surface of the object at a same time, and wherein the detecting of the wavelength dependent distributions of intensity comprises a spectral analysis of the measuring light having traversed the imaging optics.

26. The method according to claim 23, wherein the measuring light of the plural different wavelengths is incident on the surface of the object at a same time, and wherein the detecting of the wavelength dependent distributions comprises subsequent detection of distributions of an intensity of the measuring light at different wavelengths.

27. The method according to claim 23, wherein the generating of the measuring light of plural different wavelengths comprises generating of the measuring light of a single wavelength range at a time and subsequently changing the wavelength range of the generated measuring light.

28. The method according to claim 23, wherein the illuminating optics comprises a diffractive grating.

29. The method according to claim 23, wherein the target shape is an aspherical shape.

30. The method according to claim 23, wherein the processing of the surface of the object comprises at least one of milling, grinding, loose abrasive grinding, polishing, ion beam figuring, magneto-rheological figuring, and finishing the surface of the object.

31. The method according to claim 30, wherein the finishing comprises applying a coating to the surface.

32. The method according to claim 31, wherein the coating comprises at least one of a reflective coating, an anti-reflective coating and a protective coating.

33. The method according to claim 23, wherein directing the measuring light onto the surface of the object through the illuminating optics such that the measuring light is incident at plural locations of the surface is carried out such that the measuring light, including the plural different wavelengths, is incident at plural locations of the surface simultaneously.

34. A system for measuring a shape of a surface of an object, the system comprising:
- a light source for generating measuring light within a broad wavelength range;
- an illuminating optics for directing the measuring light onto the surface of the object, wherein the illuminating optics has a front surface of an optical element disposed closest to the object to be measured, and wherein a dispersion of the illuminating optics is such that, at each of plural locations on the front surface, an emission direction of measuring light of a first wavelength differs from an emission direction of measuring light of a second wavelength by more than 1 arcmin;
- an imaging optics for imaging the surface of the object onto a light detecting surface of a detector, wherein the imaging optics comprises a beam stop having an aperture disposed within a beam path of the imaging optics, the aperture having a cross section of a size which is smaller than a third of a size of an effective cross section of the beam path of the imaging optics upstream of the beam stop; and
- a spectral selector transmitting only measuring light within a narrow wavelength range, wherein the spectral selector is disposed in a beam path of the measuring light between the light source and the detector.

35. The system according to claim 34, wherein the spectral selector is disposed in the beam path of the measuring light upstream of the illuminating optics.

36. The system according to claim 34, wherein the spectral selector is disposed in the beam path of the measuring light downstream of the imaging optics.

37. The system according to claim 36, wherein a coherence length of the measuring light is shorter than an optical path length between the reference surface and a front surface of the illuminating optics disposed closest to the optical surface to be tested.

38. The system according to claim 34, wherein the spectral selector comprises an interference filter.

39. The system according to claim 34, wherein the illuminating optics comprises a diffractive grating.

40. The system according to claim 34, wherein the measuring light includes plural different wavelengths and wherein the illuminating optics directs the measuring light onto the surface of the object such that the measuring light, including the plural different wavelengths, is incident at plural locations of the surface simultaneously.

41. A system for measuring a shape of a surface of an object, the system comprising:
- an imaging optics;
- a beam stop having an aperture;
- a test piece mount configured to mount the object such that the surface of the object is disposed at a distance from a position which is conjugate to the aperture with respect to the imaging optics;
- a position sensitive detector to detect measuring light emerging from the surface of the object and having traversed the imaging optics and the aperture;
- a light source for generating measuring light within a broad wavelength range;
- an illuminating optics for directing the measuring light onto the surface;
- a spectral selector to select, from the broad wavelength range, an adjustable narrow wavelength range of the measuring light to be incident on the position sensitive detector, wherein a ratio of a width of the narrow wavelength range over a width of the broad wavelength range is less than ¼;
- and a controller configured to control the spectral selector such that plural different narrow wavelength ranges are subsequently adjusted and to receive a representation of light intensities detected by the position sensitive detector for each of the plural different narrow wavelength ranges.

42. The system according to claim 41, wherein the spectral selector comprises a controller of the light source to adjust an emission wavelength thereof.

43. The system according to claim 41, wherein the spectral selector comprises a spectral filter disposed in a beam path of the measuring light between the light source and the surface of the object.

44. The system according to claim 41, wherein the spectral selector comprises a spectral filter disposed in a beam path of the measuring light between the surface of the object and the position sensitive detector.

45. The system according to claim 41, wherein the illuminating optics comprises a diffractive grating.

46. The system according to claim 41, wherein the measuring light includes plural different wavelengths and wherein the illuminating optics directs the measuring light onto the surface of the object such that the measuring light, including the plural different wavelengths, is incident at plural locations of the surface simultaneously.

* * * * *